United States Patent Office 3,195,669
Patented July 20, 1965

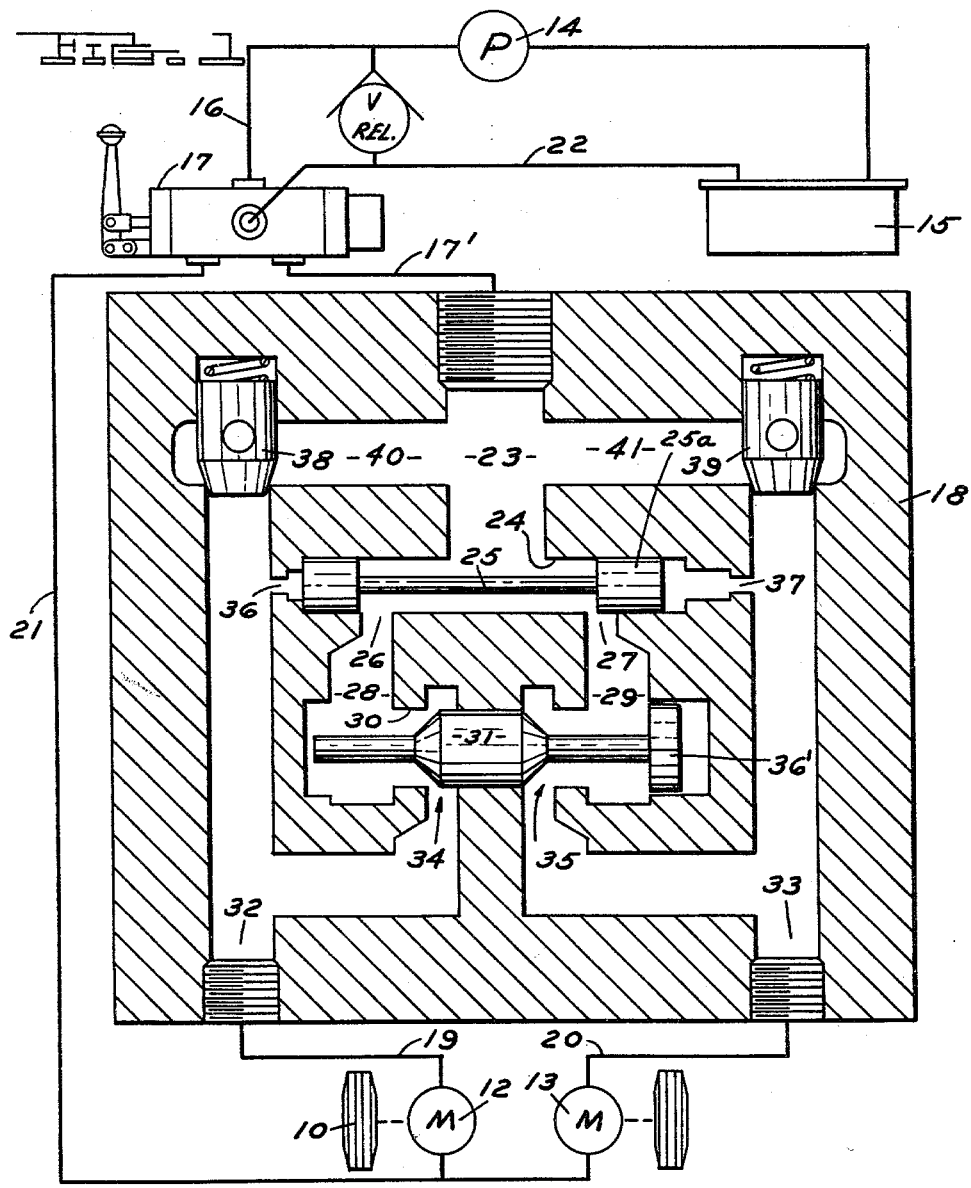

3,195,669
DIFFERENTIAL FOR HYDRAULIC MOTOR DRIVE SYSTEM
Kenneth Court, Detroit, Mich., assignor to Sperry Rand Corporation, Troy, Mich., a corporation of Delaware
Filed July 10, 1963, Ser. No. 293,973
9 Claims. (Cl. 180—66)

This invention relates to hydraulic motor drive systems and particularly to a valve that provides a no-slip differential for hydraulic motor drive systems.

In hydraulic motor drive systems such as used to drive off-the-road vehicles wherein the vehicle includes a pair of drive wheels with a hydraulic motor individual to each wheel, it is conventional and well-known to use a flow divider valve which tends to equalize the flow to each motor. By this arrangement, in the event there is a loss of traction because of slippage of one wheel, flow of liquid is directed to the motor of the other wheel to develop traction in the manner of the well-known mechanical no-slip differentials. In such systems, it is desirable that the flow divider valve be inoperative or have minimal operation during the normal operation of the vehicle as when the vehicle is going around the corner wherein one wheel tends to rotate faster than the other.

It is an object of this invention to provide a differential system for hydraulic motor drive systems wherein the effect of the flow divider valve is substantially eliminated during normal operation of the vehicle as in going around corners.

It is a further object of the invention to provide such a system which is relatively simple and low in cost.

In the drawings:

FIG. 1 is a part-sectional, partly diagrammatic view of a hydraulic motor system embodying the invention.

FIG. 2 is a graph of flow versus differential pressure curves.

Referring to FIG. 1, the hydraulic motor system embodying the invention comprises a pair of wheels 10, 11 which are driven by hydraulic motors 12, 13, the latter being of any well-known type such, for example, as the rotary cylinder, axial piston type. Hydraulic fluid is supplied to the motors 12, 13 from a pump 14 that pumps the hydraulic fluid from a reservoir 15 through a line 16 to a directional valve 17. The directional valve 17 controls the flow of liquid either through valve body 18 and lines 19 and 20 to the motors 12, 13, respectively, or through line 21 to the motors 12, 13. In one position of the valve 17, the fluid flows through a line 17', valve block 18 and lines 19 and 20 to the motors 12, 13, respectively, and then through line 21 back through valve 17 and return line 22 to the tank. In another position of the directional valve 17, the fluid flows through line 21 to motors 12, 13 and then returns through lines 19, 20, valve block 18, line 17', directional valve 17 and return line 22 to the tank.

As shown in FIG. 1, the valve body 18 comprises an inlet passage 23 which directs fluid to a bore 24 in which an orifice valve 25 is reciprocably mounted. The fluid flows from passage 23 through orifices 26, 27 and passages 28, 29 to a bore 30 wherein a flow divider valve spool 31 is positioned. The flow divider valve spool 31 is responsive to the pressures in the passages 28, 29 that control orifices 34, 35 which lead to the lines 19, 20 and to the motors 12, 13, respectively, and operates to tend to increase the flow when the pressure drops and tend to maintain flow divided in proportion to areas of orifices 26 and 27 independent of pressures developed in lines 19 and 20, all in accordance with well-known construction of flow divider valves. This is achieved by control of the orifices 34, 35. A dash pot shown diagrammatically at 36' dampens the action of the valve spool 31 in accordance with well-known practice.

The ends of bore 24 are connected by sensing ports 36, 37 to the passages 32, 33, respectively, so that the ends of the pistons 25a on the orifice valve 25 have pressure applied thereto corresponding to the pressure in the passages 32, 33. Any differential pressure between the passages 32, 33 tends to shift the control valve 25. For example, as shown in FIG. 1, the pressure in the passage 32 is less than the pressure in the passage 33 so that the valve has shifted to the left.

Where the directional valve 17 is moved so that the rotation of the wheels 10, 11 is reversed and the passages 32, 33 function as return lines, spring loaded check valves 38, 39 are provided at the ends of the passages 32, 33 and tend to open up and connect ports 40, 41 to the inlet 23 which then functions as an outlet. Flow division is not effected in this condition.

In operation, if the directional valve 17 is positioned to direct the fluid through line 17' to the inlet 23, and the position of the vehicle steering mechanism is such that the vehicle moves in a straight line, the fluid passes through orifices 26, 27 and orifices 34, 35 equally so that equal volume is required by each of the motors 12, 13 and the valve is inoperative. If, however, one of the wheels 10, 11 tends to move at a greater rate than the other as, for example, when the vehicle is moving around a corner, flow required by the outside wheel motor will be greater than flow required by the inside wheel motor. This difference in flow will create a pressure differential between lines 32, 33 that tends to shift the orifice valve 25. The orifice valve 25 then operates and shifts to one extreme position or the other changing the relative size of the orifices 26, 27.

Specifically, as shown in FIG. 1, if the pressure in the passage 32 becomes less than the pressure in the passage 33 as when the motor 12 requires greater flow than motor 13 then the control valve 25 shifts to the left making orifice 26 a predetermined amount larger than orifice 27. This permits an increase in the flow to the area 28 and, in turn, to the passage 32 and decreases the flow to the area 29 and, in turn, the passage 33 to allow the vehicle to make turns which require differential in wheel speeds with equal traction to each wheel. However, if the difference in flow exceeds the predetermined amount established by the difference in relative sizes of orifices 26, 27, a pressure differential will tend to develop between passages 28, 29 causing divider spool 31 to function and adjust orifices 34, 35 to limit the maximum flow to motor 12 and assure a predetermined minimum flow to motor 13. This condition would usually occur if wheel 10 lost traction and tended to spin-out. A dividing action under this condition limits the maximum flow to the slipping wheel, yet maintains a minimum flow to the other wheel to develop traction and provide the desired no-spin differential feature.

The manner in which the combined orifice valve and flow divider valve arrangement in body 18 controls the system is further enhanced by certain characteristics that occur in flow divider valves that can be understood by reference to the curves shown in FIG. 2 which represent flow versus differential pressure. As shown in the broken lines, without the presence of the orifice valve 25, because of velocity effects the flow divider valve would increase the flow to one side and decrease the flow to the other side in response to changes in differential pressure in lines 32, 33. This characteristic is undesirable for vehicles because equal flow division is obtained at low differential pressures when flow division is unwanted, as in making a turn, and unequal flow division, namely, increased flow is directed to the high pressure motor when high differential occurs which would tend to make the wheel with better traction spin-out when a no-slip feature is desired. However, the presence of the orifice valve 25 operates upon a slight change in pressure between the lines 32, 33 to increase the flow in the low pressure line and decrease the flow in the high pressure line substantially the same amount. This displaces the position of curves shown in FIG. 2 from the broken lines to the solid lines. At low differential, a desirable wide difference in flow is permitted as previously described. Then, as the pressure differential between the two lines increases, as, for example, as the one wheel loses traction and begins to slip, the operation of the flow divider valve 31 serves to begin to decrease the flow in the low pressure line and increase the flow in the high pressure line. When the wheel 12 being fed by the low pressure line finally slips and loses all traction, the flow is substantially equal to both lines so that vehicle speed is essentially the same as it was before slipping occurred.

I claim:
1. In a hydraulic system, the combination comprising a vehicle including a pair of drive wheels, a hydraulic motor individual to each wheel for driving each wheel, a hydraulic pump for supplying hydraulic liquid to each motor, a flow divider valve interposed between the pump and the motors and responsive to the flow of liquid to each motor to tend to maintain equal flow to each motor, and means hydraulically connected to said system and responsive to a pressure differential of hydraulic fluid flowing to said motors for restricting the flow to the motor having the higher pressure of the hydraulic fluid by a predetermined amount and unrestricting the flow to the motor having the lower pressure by a predetermined amount.

2. The combination set forth in claim 1 wherein said last-mentioned means is operative to provide a maximum restriction after a predetermined minimum pressure differential between the fluid flowing to each of the motors.

3. In a hydraulic system, the combination comprising a vehicle including a pair of wheels, a hydraulic motor individual to each wheel for driving each wheel, a hydraulic pump for supplying hydraulic liquid to each motor, a valve body including a flow divider valve interposed between the pump and the motors and responsive to the flow of liquid to each motor to tend to maintain equal flow to each motor, and means in said valve body connected to said system and responsive to a pressure differential of hydraulic fluid flowing to said motors for restricting the flow to the motor having the higher pressure of hydraulic fluid by a predetermined amount and unrestricting the flow to the motor having the lower pressure by a predetermined amount.

4. In a hydraulic system, the combination comprising a vehicle including a pair of drive wheels, a hydraulic motor individual to each wheel for driving each wheel, a hydraulic pump for supplying hydraulic liquid to each motor, a flow divider valve interposed between the pump and the motors and including a spool and a pair of outlets connected to said hydraulic motors, said spool being responsive to the flow of liquid to each motor to tend to maintain equal flow to each motor, and means hydraulically connected to said system and including a spool responsive to a pressure differential of hydraulic fluid flowing to said motors for restricting the flow to the motor having the higher pressure of hydraulic fluid by a predetermined amount and unrestricting the flow to the motor having the lower pressure by a predetermined amount.

5. For use in a hydraulic system, a vehicle including a pair of wheels, a hydraulic motor individual to each wheel for driving each wheel, a hydraulic pump for supplying hydraulic liquid to each motor, the combination comprising a valve body including a flow divider valve interposed between the pump and the motors and responsive to the flow of liquid to each motor to tend to maintain equal flow to each motor, and means in said valve body connected to said valve inlets and responsive to a pressure differential of hydraulic fluid flowing through said outlets to said motors for restricting the flow to the motor having the higher pressure of hydraulic fluid by a predetermined amount and unrestricting the flow to the motor having the lower pressure by a predetermined amount.

6. For use in a hydraulic system, a vehicle including a pair of wheels, a hydraulic motor individual to each wheel for driving each wheel, a hydraulic pump for supplying hydraulic liquid to each motor, the combination comprising a valve body including a flow divider valve interposed between the pump and the motors and including a spool, a pair of inlets and a pair of outlets connected to said hydraulic motors, said spool being responsive to the flow of liquid to each motor to tend to maintain equal flow to each motor, and means in said valve body connected to said valve inlets and including a spool responsive to a pressure differential of hydraulic fluid flowing through said outlets to said motors for restricting the flow to the motor having the higher pressure of hydraulic fluid by a predetermined amount and unrestricting the flow to the motor having the lower pressure by a predetermined amount.

7. In a hydraulic system, the combination comprising a pair of hydraulic motors, a hydraulic pump for supplying hydraulic liquid to each motor, a flow divider valve interposed between the pump and the motors and responsive to the flow of liquid to each motor to tend to maintain equal flow to each motor, and means connected to said system and responsive to a pressure differential of hydraulic fluid flowing to said motors for restricting the flow to the motor having the higher pressure of hydraulic fluid by a predetermined amount and unrestricting the flow to the motor having the lower pressure by a predetermined amount.

8. In a hydraulic system, the combination comprising a vehicle including a pair of wheels, a hydraulic motor individual to each wheel for driving each wheel, a hydraulic pump for supplying hydraulic liquid to each motor, a valve body including a spool type flow divider valve interposed between the pump and the motors and responsive to the flow of liquid to each motor to tend to maintain the flow of each motor, said valve body having an inlet and a pair of inlet passages extending from said inlet to said flow divider spool, and a pressure responsive spool interposed in said inlet and adapted to selectively restrict said inlet passages, said valve body including a pair of outlets, said flow divider spool controlling flow through said outlets, and pressure responsive passages providing communication between said outlets and the ends of said pressure responsive spool for controlling the position of said pressure responsive spool and thereby restricting the flow to the motor having the higher pressure of hydraulic fluid by a predetermined amount and unrestricting the flow to the motor having a lower pressure by a predetermined amount in response to a pressure differential hydraulic flow of fluid flowing through said outlet to said motors.

9. For use in a hydraulic system including a pair of hydraulic motors and a hydraulic pump for supplying hydraulic liquid to each motor, the combination comprising
a valve body including a spool type flow divider valve interposed between the pump and the motors and responsive to the flow of liquid to each motor to tend to maintain the flow of each motor,
said valve body having an inlet and a pair of inlet passages extending from said inlet to said flow divider spool,
and a pressure responsive spool interposed in said inlet and adapted to selectively restrict said inlet passages,
said valve body including a pair of outlets,
said flow divider spool controlling flow through said outlets,
and pressure responsive passages providing communication between said outlets and the ends of said pressure responsive spool for controlling the position of said pressure responsive spool and thereby restricting the flow to the motor having the higher pressure of hydraulic fluid by a predetermined amount and unrestricting the flow to the motor having a lower pressure by a predetermined amount in response to a pressure differential hydraulic flow of fluid flowing through said outlet to said motors.

References Cited by the Examiner
UNITED STATES PATENTS

| | | | |
|---|---|---|---|
| 2,650,573 | 9/53 | Hickman | 60—53 |
| 2,980,193 | 4/61 | Baudhuin | 180—6.48 |
| 3,114,424 | 12/63 | Voreaux | 180—6.3 |

JULIUS E. WEST, *Primary Examiner.*
EDGAR W. GEOGHEGAN, *Examiner.*